DIGITIZER WITH POWER ASSISTED INDEX MEMBER

Filed Feb. 6, 1969 3 Sheets-Sheet 1

INVENTORS
HEINZ JOSEPH GERBER
DALE G. BLAKE
BY
McCormick, Paulding & Huber
attorneys INVENTORS
HEINZ JOSEPH GERBER
DALE G. BLAKE
BY
McCormick, Paulding & Huber
attorneys INVENTORS
HEINZ JOSEPH GERBER
DALE G. BLAKE
BY
McCormick, Paulding & Huber
attorneys 3,553,842

DIGITIZER WITH POWER ASSISTED INDEX MEMBER

Heinz Joseph Gerber, West Hartford, and Dale G. Blake, Vernon, Conn., assignors to The Gerber Scientific Instrument Company, South Windsor, Conn., a corporation of Connecticut Filed Feb. 6, 1969, Ser. No. 797,155
Int. Cl. G01b 5/24
U.S. Cl. 33—1 10 Claims

ABSTRACT OF THE DISCLOSURE

A digitizer for reducing a line or edge of a map, graph, drawing or the like to coordinate information includes an index member, such as a reticle, manually movable along the line or edge being digitized. The index member is attached to X and Y strings each of which is wound in part on an associated drum so as the index member is moved along the line or edge one or the other or both of the strings is unwound from or wound onto its drum. The drums are mounted on carriages movable in the X and Y directions along two edges of the digitizer and the carriages are in turn driven by drive motors which are controlled by the movement of the strings so that the carriages are automatically slaved to the movement of the strings and thereby maintained in aligned relationship with the index member. Encoders connected with the drums or the carriage drive system provide the desired output information.

BACKGROUND OF THE INVENTION

This invention relates to devices referred to as X–Y coordinate digitizers used for reducing lines, edges or other graphic features of a map, drawing, graph, or other similar artwork or graphic to coordinate information for use by a computer or other data processing device, and deals more particularly with such a device wherein a reticle of other index member is moved manually along the line or edge being digitized and has connected with it a powered follow-up drive system so as to minimize the effort required to move and position the reticle.

Previous manually operated digitizers have consisted of an index member grasped by the operator and moved along the line or edge in question. Such an index member is attached to carriages or the like movable in the X and Y directions relative to a given work surface to permit it to be moved to any point on such surface, and therefore as the index member is moved it is necessary, to achieve such movement, that the carriages or other supporting mechanism also be moved. In the case of very large digitizers the supporting mechanism is necessarily quite large, and despite efforts to reduce its weight and the friction between moving parts a considerable amount of force need be applied to the index member in order to achieve the desired movement. This is not only fatiguing to the operator but also makes it difficult to bring the index member into proper registration with the feature being digitized, accordingly making the digitizing process relatively slow, tedious and often times less accurate than desired.

The general object of this invention is, therefore, to provide a digitizer wherein the reticle or other index member may be moved manually with a very small amount of manual force, thereby allowing faster and more accurate digitizing with less fatigue of the operator. The reticle moving system of this invention is of particular benefit when used with relatively large digitizers wherein the problem of moving the reticle has been particularly troublesome in the past, but the use of the system is not limited to such large digitizers and may be used to significant advantage with smaller size digitizers as well.

SUMMARY OF THE INVENTION

The invention resides in an X–Y coordinate digitizer having a work surface, for supporting a sheet of paper or the like containing a line or edge to be digitized, and a reticle or other index means movable in the X and Y directions over the work surface so as to be movable along or to any point of the line or edge being digitized. The reticle is attached to two strings extending respectively in the X and Y directions. Each string has one end fixed to the reticle and its other end wound on a drum located along one edge of the work surface. The drum is spring biased or otherwise activated so as to tend to reel in the associated string and draw the reticle toward it when no manual force is exerted on the reticle. The drum is contained in or on a carriage movable along one edge of the work surface in a direction perpendicular to the string. A motorized drive system is provided for driving each of the carriages along its respective edge of the work surface and each drive system is responsive to the movement of the string of the other carriage so as to maintain its carriage aligned with the reticle. That is, for example, as the reticle is moved in the X direction the X extending string is pulled from or wound onto its drum and a means responsive to this movement of the string is used to control the operation of the drive motor for the other carriage so that the other carriage is maintained aligned with the reticle, thereby keeping the Y extending string perpendicular to the X extending string. Encoders connected with the two drums or the two carriage drives provide the desired output information.

DESCRIPTION OF THE PREFERRED EMBODIMENTS

Figure 1:
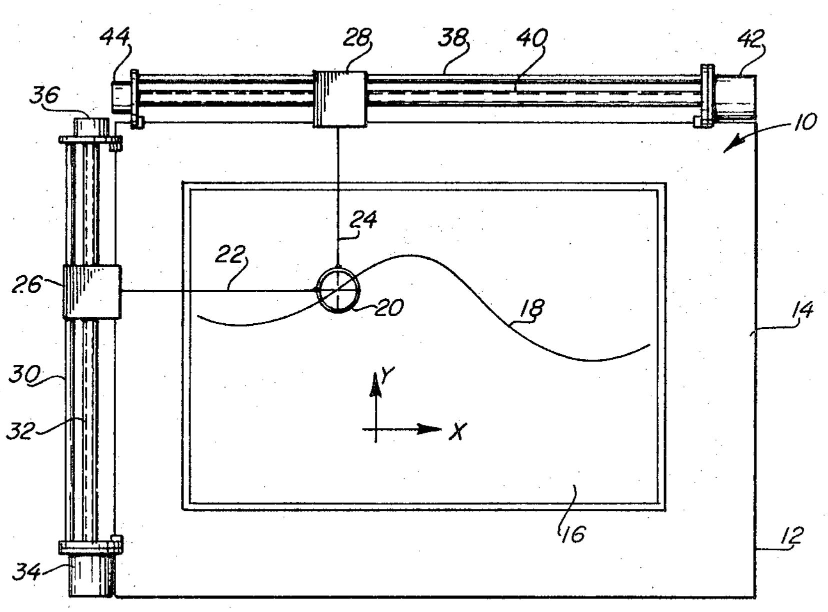
FIG. 1 is a plan view of a digitizer embodying the invention.
Figure 2:
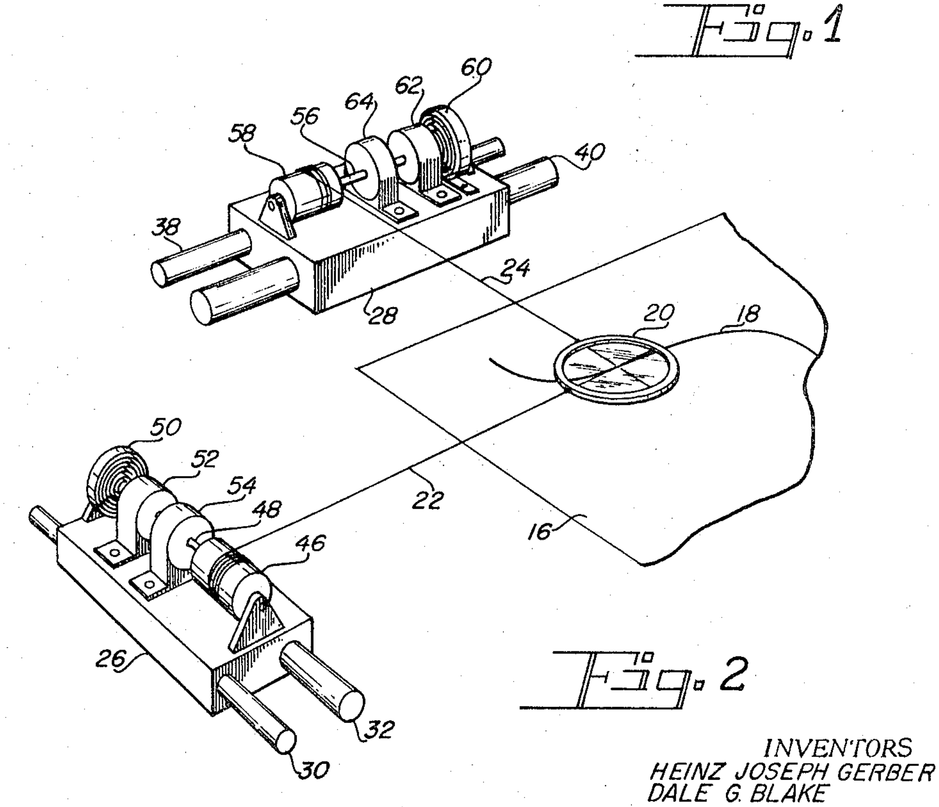
FIG. 2 is a fragmentary perspective view showing a portion of the digitizer of FIG. 1.
Figures 3, 4:
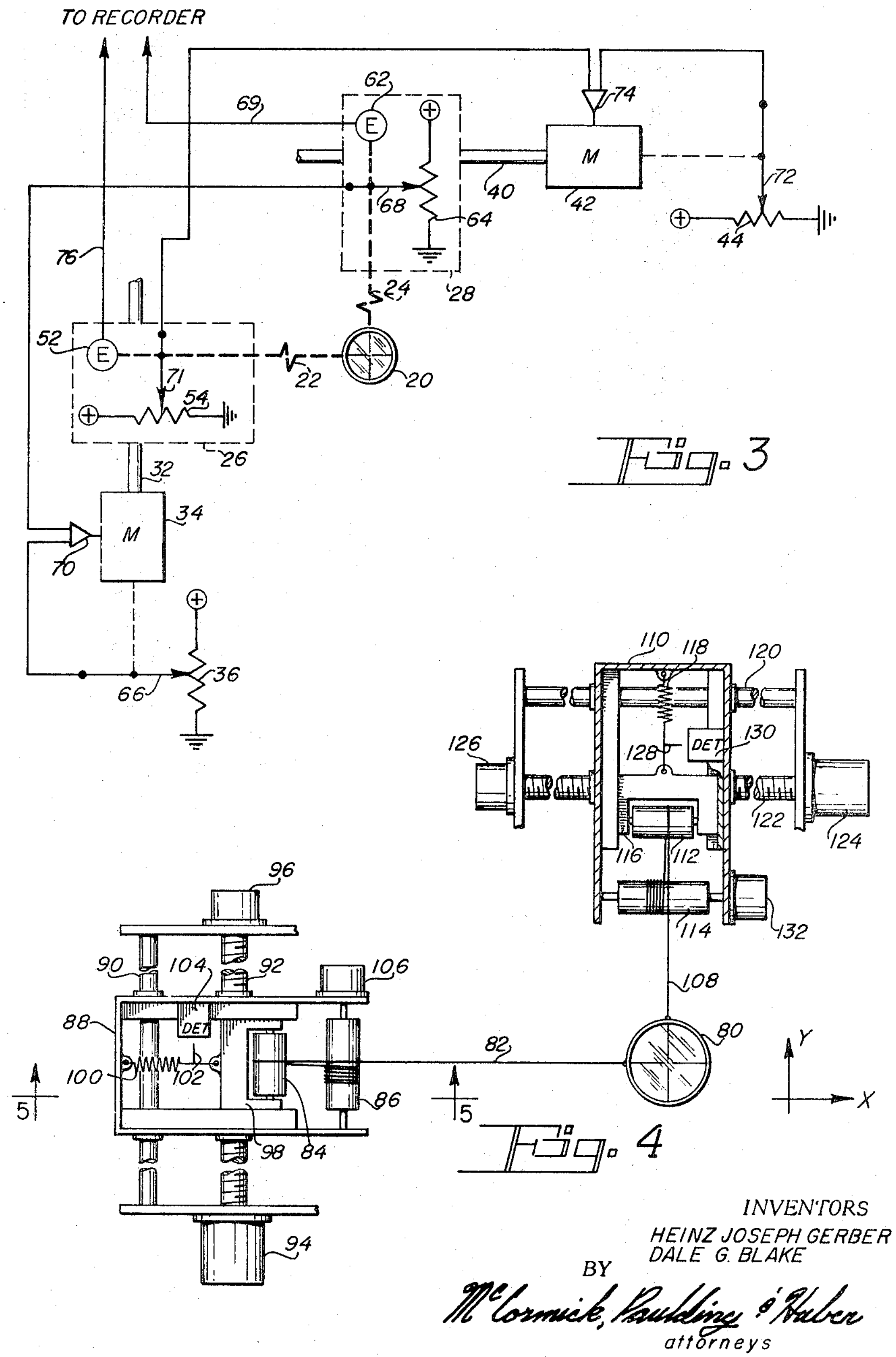
FIG. 3 is a schematic diagram illustrating the drive and control system of the digitizer of FIG. 1.
FIG. 4 is a fragmentary plan view of a portion of a digitizer comprising another embodiment of this invention.

Turning first to FIGS. 1, 2 and 3, which illustrate one embodiment of this invention, and first considering particularly FIG. 1, the digitizer illustrated therein is indicated generally at 10 and includes a table 12 providing a flat working surface 14 for supporting a sheet of paper or other similar item having a line or edge thereon which is to be digitized. In the illustrated case this item is shown to be a graph sheet 16 having a line 18 thereon to be digitized. The sheet 16 may be held to the work surface 14 by any suitable means such as, for example, a vacuum applied to the under surface of the sheet so the sheet is held to the work surface 14 by atmospheric pressure. The table 12 may be oriented in either a vertical plane, a horizontal plane or some inclined plane, and in the case of large size digitizers is normally located in an inclined, close to vertical, plane during digitizing. The arrows in FIG. 1 indicate respectively the directions of the X and Y coordinate axes.

To perform the digitizing process, the digitizer 10 of FIG. 1 includes an index member in the form of a reticle 20 having cross-hairs thereon which intersect at a given index point. In digitizing, the index point of the reticle is moved from point to point along the line 18 by grasping and moving the reticle. Attached to the reticle are two elongated flexible elements 22 and 24. These flexible elements are or may be in the nature of cords, cables, wires or the like and are for convenience herein referred to as "strings," it being understood that the word "string" is to be interpreted in a broad sense to refer to any such suitable flexible member. The string 22 is attached at its right hand end to the reticle 20 and extends in the X direction to an associated carriage 26 located along the left hand edge of the table 12. Since it extends in the X direction the string 22 is herein referred to as the "X string." The other string 24 has its lower end attached to the reticle 20 and extends upwardly in the Y direction to another carriage 28 located along the upper edge of the table 12. Since it extends in the Y direction this string 24 is referred to as the "Y string."

Still referring to FIG. 1, the carriage 26 is supported for movement in the Y direction along the left hand edge of the table 12 by a guide rail 30 and lead screw 32. The lead screw is rotated to move the carriage in the Y direction by an associated motor 34, and a potentiometer 36 is also connected with the lead screw 32 to provide a signal related to the angular displacement of the lead screw, and accordingly of the Y position of the carriage 26, for a purpose hereinafter described. Similarly, the carriage 28 is supported for movement in the Y direction along the upper edge of the table 12 by another guide rail 38 and lead screw 40, the lead screw 40 being rotated by an associated motor 42 to move the carriage 28, and a potentiometer 44 is connected with the lead screw 40 to provide a signal related to its angular displacement and of the X position of the carriage 28.

Turning now to FIG. 2, which shows in more detail the mechanism mounted on each of the carriages 26 and 28 and first considering the carriage 26, the X string 22 associated with this carriage is wound at its left hand end onto a drum 46 fixed to a shaft 48 supported for rotation relative to the carriage 26 about an axis arranged parallel to the Y axis. A spiral spring 50 has one end fixed to the shaft 48 and its other end fixed to the carriage 26 and acts to bias the shaft and the drum 46 so as to tend to wind in the X string 22 onto the drum 26, thereby tending to draw the reticle 20 toward the carriage 26. The biasing force exerted by the spring 50 is, however, relatively small so that the operator may move the reticle 20 away from the carriage 26, and hold it at any given position, by exerting only a small amount of force thereon. Also carried by the carriage 26 and connected with the shaft 48 is an encoder 52 and a potentiometer 54 both serving to provide signals related to the angular displacement of the shaft 48.

The carriage 28 is identical with the carriage 26 with regard to the components mounted thereon, these components including a shaft 56 supported for rotation relative to the carriage 28 about an axis extending parallel to the X axis, a drum 58 fixed to the shaft 56 for receiving the upper end portion of the Y string 24, a spring 60 for biasing the shaft 56 so as to tend to wind in the string 24 and pull the reticle toward the carriage 28, and an encoder 62 and a potentiometer 64 for providing a signal related to the angular displacement of the shaft 56.

The two potentiometers 36 and 44 connected respectively with the lead screws 32 and 40, and the two potentiometers 54 and 64 connected with the drum shafts 48 and 56, respectively, are electrically connected with the motors 34 and 42 and in conjunction therewith form two bridge or balancing type servo systems, one for each motor, for causing the upper carriage 28 to be moved in the X direction in slaved relation to the movement of the reticle 20 in the X direction and for similarly causing the left hand carriage 26 to be moved in the Y direction in slaved relation to the movement of the reticle 20 in the Y direction. The connection of the components to achieve this type of control for the driving of the carriages is shown in FIG. 3. Referring to this figure, wherein the various parts are shown schematically, it will be noted that the wiper 66 of the potentiometer 36 is drivingly connected with the shaft 32 and motor 34 so as to be moved to different positions along its associated slidewire as the shaft 32 is rotated and thereby to have a voltage applied thereto corresponding to the angular position of the shaft 34 and the Y position of the carriage 26. The potentiometer 64 on the carriage 28 in turn has its wiper 68 positioned in accordance with the Y position of the reticle 20. That is, as the Y string 24 is moved in the Y direction the string 24 is wound onto or off of the drum 58 which in turn rotates the shaft 56 to which the wiper 68 is fixed. Therefore, the voltage on the wiper 68 is directly related to and indicates the Y position of the reticle 20. The voltages appearing on the two wipers 66 and 68 are applied to a summing amplifier 70 which serves to sum the same and to provide an amplified version of the difference or error voltage to the motor 34, the motor 34 being a reversible servo motor adapted to rotate in one direction in response to one polarity voltage signal and in the opposite direction in response to the opposite polarity voltage signal.

In considering the operation of the system of FIG. 3 as so far described, the drive system for the Y carriage 26 is balanced when the voltages on the wipers 66 and 68 are equal. When this is the case no output is produced from the amplifier 70 and the motor 34 remains unenergized and the carriage 26 stationary. Assume now, however, that the reticle 20 is displaced in the Y direction by moving it directly downwardly from the illustrated position. This pulls some of the Y string 24 off of its drum 58 and repositions the wiper 68 of the potentiometer 64 to change the voltage appearing thereat. As a result of this change in voltage the amplifier 70 now produces an output error signal which energizes the motor 34 to drive the lead screw 32 and the carriage 26. The motor connections are such that the motor 34 is energized by the error voltage to drive the carriage 26 in the same direction (downwardly) as the displacement of the reticle 20. Furthermore, as the motor operates to drive the lead screw 32 the associated wiper 66 of the potentiometer 36 is displaced to change its voltage and again the various connections are such that the voltage on the wiper 66 is changed in the same direction as the change of the voltage on the wiper 68 so that the motor drives toward a null position at which the voltage on the wiper 66 is again balanced or matched with that of the voltage on the wiper 68, thereby producing a zero output to the motor 34 from the amplifier 70. Still further, the driving ratios between the various parts and the characteristics of the potentiometers are chosen so that a given displacement of the reticle 20 in the Y direction results in an exactly equal follow-up movement of the carriage 26 in the Y direction as it is driven from its original null position to the new null position. Of course, an error signal is produced from the amplifier 70 as soon as the reticle 20 is moved only slightly from a balanced position, and the carriage 26 accordingly almost immediately begins to follow any movement of the reticle in the Y direction thereby keeping the X string 22 at all times perpendicular or substantially perpendicular to the Y string 24. Also, the encoder 62 is connected with the reticle 20 through the shaft 56, drum 58 and string 24 and supplies a signal indicative of the Y position of the reticle, which signal is one of the coordinate outputs of the digitizer and is transmitted to a suitable recorder, or the like, over the output line 69.

Still referring to FIG. 3, the drive system for moving the carriage 28 is substantially similar to that described above for moving the carriage 26. More particularly, it includes the potentiometers 54 and 44 which have their wipers 71 and 72 positioned respectively by the X string 22 and by the lead screw 40 and motor 42. The voltages appearing at these two wipers are summed in a summing amplifier 74 which produces an amplified version of the difference or error voltage applied to the motor 42 to energize it to drive the lead screw 40. Therefore, starting from a balanced condition, when the reticle 20 is moved in the X direction, the X string 22 is pulled off of or wound onto the associated drum 46 and this rotation of the drum repositions the wiper 71 of the potentiometer 54 to change the voltage appearing thereat and to produce an error signal from the amplifier 74 energizing the motor 42. The motor 42 in response to this energization drives the carriage 28 in the same direction as the movement of the reticle 20 and in doing so repositions the wiper 72 of the potentiometer 44 to bring it to a new balanced or null position with respect to the wiper 70. Again, the various drive ratios between the parts involved and the characteristics of the potentiometers 54 and 44 are such that when a given movement of the reticle 20 in the X direction is made, the carriage 28 is moved an equal displacement so as to continuously maintain the Y string 24 perpendicular to the X string 22. Also, the movement of the reticle 20 in the X direction is sensed by the encoder 52 on the carriage 26 which produces an output signal on the line 76 which is indicative of the X coordinate of the reticle 20, this signal being the other coordinate output of the digitizer and being transmitted to the associated recorder or the like over the output line 76.

Figure 5:
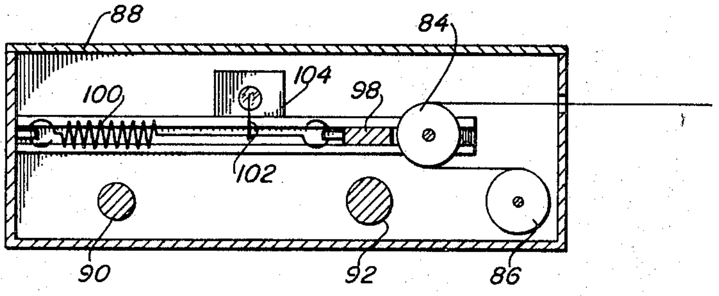
FIG. 5 is a vertical sectional view taken on the line 5—5 of FIG. 4.
Figure 6:
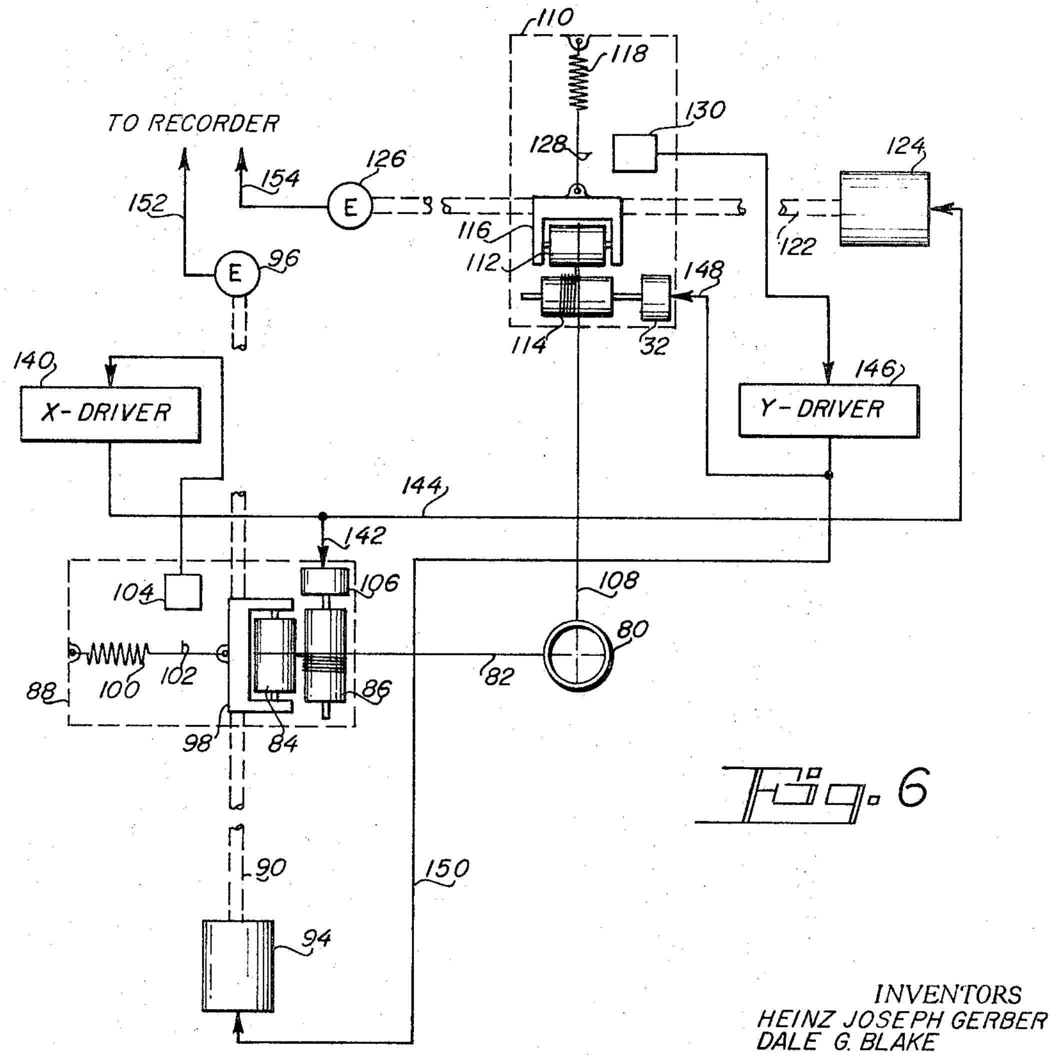
FIG. 6 is a schematic view illustrating the drive and control system of the digitizer of FIG. 4.

FIGS. 4, 5 and 6 illustrate another embodiment of this invention. Referring first to FIG. 4, this figure is a plan view of a fragment of a digitizer which may be substantially identical to that of FIG. 1 except for the construction of the carriages and their drive mechanism. Therefore, FIG. 4 shows only the carriages and their drive mechanism, and other parts of the digitizer have been omitted for clarity. Referring to FIG. 4, the reticle of the illustrated digitizer is indicated at 80 and is adapted for movement in the X and Y directions over a sheet of paper or the like supported on an underlying support or work surface. An X string 82 is attached at its right hand end to the reticle 80 and at its left hand end portion first passes over a roller 84 and then is wound onto a drum 86, as shown best in FIG. 5, both of which latter parts are mounted on a carriage 88 supported for movement in the Y direction by a guide rail 90 and lead screw 92. Movement of the carriage 88 in the Y direction is effected by a stepping motor 94 connected with the lead screw 92 and an encoder 96 is also connected with the lead screw 92 to provide a signal representative of the Y position of the carriage 88 and accordingly of the Y position of the reticle 80, as hereinafter described.

The roller 84 over which the X string 82 passes is carried by a member 98 supported by the carriage 88 for sliding movement relative thereto in the X direction and biased toward the left in FIG. 4 by a helical tension spring 100 connected between it and the carriage. Therefore, the position of the sliding member relative to the carriage is determined by the force exerted on the X string 82 and may be used to indicate the string tension. The sliding member 98 has a given neutral position relative to the carriage 88 and a detecting mechanism is included on the carriage 88 for detecting its position relative to such neutral position. In the illustrated case, this detecting mechanism is shown to comprise a vane 102 fixed to the right hand end of the spring 100, which in turn is fixed to the member 98 so that the vane is in effect fixed relative to the member 98 and moves therewith, and an associated detector 104 cooperating with the vane 102 operable to produce one output signal when the vane is on one side of its neutral position, another output signal when the vane is on the opposite side of its neutral position and a third zero signal when the vane is located exactly at its neutral position. The detector 104 may take various different forms and may for example, be a photoelectric device. The carriage 88 also carries a stepping motor 106 which is directly connected with and drives the drum 86 on which the X string 82 is wound.

Also connected with the reticle 80 of FIG. 4 is one end of a Y string 108 which at its other end is connected to mechanism on a carriage 110 which mechanism and carriage are substantially identical to that associated with the X string 82. More particularly, the Y string 108 passes over a roller 112 and is wound onto a drum 114, the roller 112 being supported by a sliding member 116 supported for sliding movement in the Y direction relative to the carriage 110 and biased upwardly in FIG. 4 by a spring 118 connected between the member 116 and the carriage. The carriage is guided for movement in the X direction by a guide rod 120 and lead screw 122 and is driven in the Y direction by a stepping motor 124 connected with the lead screw 122, an encoder 126 also being connected with the lead screw 122 to provide an output signal indicative of the X position of the carriage 110. The spring 118 has a vane 128 attached to the end thereof fixed to the member 116, and an associated detector 130 provides signals indicating the position of the vane 128 relative to its neutral position. The drum 114 on which the Y string 108 is wound is driven by another stepping motor 132 carried by the carriage 110.

FIG. 6 shows schematically the electrical connections between the various components of the FIG. 4 device, and referring it to this figure it will be noted that the electrical circuit includes an X driver 140 which provides output pulses that are delivered simultaneously to the stepping motors 106 and 124, over the lines 142 and 144, so that both of said motors are operated in synchronism. The X driver 140 is responsive to the output from the detector 104 on the carriage 88 and the connections between the parts are such that when the vane 102 is on one side of its neutral position the X driver produces pulses energizing the stepping motors 106 and 124 to rotate in one direction, when the vane 102 is on the opposite side of its neutral position the X driver produces pulses which energize the motors 104 and 124 to rotate in the opposite directions, and when the vane 102 is positioned exactly at its neutral position no output pulses are produced from the X driver 140 so that both motors 104 and 124 remain stationary.

With the description of FIG. 6, as given above, assume first that the reticle 80 is held at a given point and that the vane 102 is located at its neutral position so that a balanced condition exists and the stepping motors are stationary. That is, no output pulses are produced from the X driver 140 and both of the stepping motors 106 and 122 therefore remain stationary so that the drum 86 and the carriage 110 are likewise held in stationary positions. Assume now, however, that the reticle is moved in the X direction toward the right in FIG. 6. This movement of the reticle pulls on the X string 82 and initially causes the sliding member 98 to be moved to the right, against the bias of the spring 100, thereby shifting it and the associated vane 102 from their neutral positions and producing an output from the detector 104. The signal produced by the detector 104 causes the X driver to generate pulses which are supplied to both the stepping motor 106 and the stepping motor 124 causing them to rotate in unison. The directions of rotation of these two motors are matched so that the motor 124 rotates the lead screw 122 to move the carriage 110 to the right in the same direction as the movement of the reticle 80, and the motor 106 rotates the drum 86 to pay out more of the X string 82 thereby relieving the string tension on the drum 84 and allowing the sliding member 98 to return toward its neutral position. The relative drive ratios between the various parts are such that the number of steps of the motor 106 required to return the vane 102 to its neutral position is exactly the same as the number of steps of the motor 124 required to move the carriage 110 to the new X position of the reticle 80. Accordingly, it will be appreciated that a powered follow-up system is provided whereby the carriage 110 is caused to automatically follow the movement of the reticle 80 in the X direction.

The means for driving the carriage 88 in the Y direction in response to the movement of or the force exerted on the Y string 108 is identical to that described above for driving the carriage 110, and as shown in FIG. 6 consists of a Y driver 146 which produces output pulses transmitted simultaneously to the stepping motor 94 and the stepping motor 132 over the lines 148 and 150, the driver being responsive to signals supplied by the detector 130. When the reticle 80 is moved in the Y direction it either increases or decreases the force exerted on the roller 112 and causes the sliding member 116 to be shifted from its neutral position. This shift in position in turn causes the detector 130 to produce an output signal transmitted to the driver which causes the driver to produce pulses transmitted to the stepping motors 94 and 132, the pulses transmitted to the motor 94 being such as to cause the carriage 88 to be driven in the same direction as the movement of the reticle 80 and the pulses transmitted to the motor 132 being such as to cause the drum 114 to be rotated in such a direction as to return the sliding member 114 to its neutral position. Therefore, as the reticle 80 is moved in either direction along the Y axis a corresponding movement of the carriage 88 is automatically produced which maintains the X string 82 perpendicular to the Y string 108. Since the two carriages 88 and 110 are thereby maintained at all times aligned with the X and Y coordinate positions of the reticle 80, by the drive means described above, the encoders 96 and 112 attached to the respective lead screws 90 and 122 likewise produce signals representative of the X and Y coordinates of the reticle, and these signals are transmitted by the associated output lines 152 and 154 to a recorder or the like and comprise the desired outputs of the device.

What is claimed is:

1. In an X–Y digitizer having a work surface extending in given X and Y coordinate directions for supporting an item containing a feature to be digitized, the combination comprising: an index member movable by hand over said work surface in said X and Y coordinate directions, a first carriage movable along one edge of said work surface in said Y coordinate direction, a second carriage movable along another edge of said work surface in said X coordinate direction, first drive means including a first motor for driving said first carriage in said X direction, second drive means including a second motor for driving said second carriage in said Y direction, an X string associated with said second carriage, said X string being fixed at one end to said index member and extending therefrom in said X coordinate direction to said second carriage, said second carriage including a means for storing a portion of said X string and for paying out said string as said index member is moved in the X direction away from said second carriage and for taking up said string as said index member is moved in the X direction toward said second carriage, a Y string associated with said first carriage, said Y string being fixed at one end to said index member and extending therefrom in the Y direction to said first carriage, said first carriage including a means for storing a portion of said Y string and for paying out said Y string as said index member is moved in the Y direction away from said first carriage and for taking up said string as said index member is moved in the Y direction toward said first carriage, means for controlling the energization of said first motor in response to the paying out and taking up of said X string, and means for controlling the energization of said second motor in response to the paying out and taking up of said Y string.

2. The combination defined in claim 1 further characterized by said means for paying out and taking up said X string constituting a drum on which a portion of said X string is wound, and means for rotating said drum in one direction to pay out said X string as said index member is moved away from said second carriage and for rotating said drum in the opposite direction to take up said X string as said index member is moved toward said second carriage, and said means for controlling said first motor in response to the paying out and taking up of said X string comprising control means connected between said drum and said first motor for causing said first motor to follow the rotation of said drum.

3. The combination defined in claim 2 further characterized by said means for rotating said drum to pay out said X string as said index member is moved away from said second carriage and to take up said X string as said index member moved toward said second carriage comprising a spring working between said drum and said second carriage for angularly biasing said drum so as to tend to take up said X string and pull said index member toward said second carriage.

4. The combination defined in claim 3 further characterized by said control means comprising a first potentiometer connected with said drum and adapted to produce an output voltage related to the angular position of said drum relative to said second carriage, a second potentiometer connected with the said first carriage and operable to produce an output voltage representative of the position of said first carriage in said X coordinate direction, and means connecting said two potentiometers with one another and with said first motor to produce a bridge type servo system.

5. The combination defined in claim 1 further characterized by said means for paying out and taking up said X string constituting a drum on which a portion of said X string is wound, a stepping motor drivingly connected with said drum, said means for controlling the energization of said first motor in response to the paying out and taking up of said X string comprising means for energizing said drum driving stepping motor to rotate said drum to pay out said X string as said index member is moved away from said second carriage and for energizing said drum driving stepping motor to rotate said drum in the opposite direction to take up said X string as said index member is moved toward said second carriage, said first motor for driving said first carriage also being a stepping motor, and said means for controlling the energization of said first motor in response to the paying out and taking up of said X string comprising means for energizing said first motor simultaneously and in synchronism with the energization of said drum driving stepping motor.

6. The combination defined in claim 5 further characterized by said means for energizing said drum driving stepping motor as said index member is moved toward or away from said second carriage comprising means for energizing said latter motor in response to the force exerted on said X string so as to rotate said drum to pay out said X string when said force exceeds a given value and to rotate said drum to take in said X string when said force is less than a given value.

7. The combination defined in claim 5 further characterized by said means for energizing said drum driving stepping motor as said index member is moved toward or away from said second carriage comprising a spring biased member over which said X string passes in going from said drum to said index member and having a position relative to said second carriage dependent on the force exerted on said X string, and means responsive to the position of said latter member relative to said second carriage for energizing said drum driving stepping motor.

8. The combination defined in claim 7 further characterized by said means for energizing said first motor simultaneously and in synchronism with the energization of said drum driving stepping motor comprising a single driver connected between said spring biased member and said first motor and said drum driving stepping motor for generating a motor energizing output signal in response to the position of said spring biased member and for delivering such output signal simultaneously to said latter two motors.

9. The combination as defined in claim 5 further characterized by said means for energizing said drum driving stepping motor as said index member is moved toward or away from said second carriage comprising a roller over which said X string passes in going from said drum to said index member, means supporting said roller for bodily movement relative to said second carriage in the direction of the force exerted thereon by said X string, biasing means for urging said roller in the direction opposite to that of the force exerted thereon by said X string, and means for energizing said drum driving stepping motor to rotate said drum to pay out said X string when said roller is located on one side of a given neutral position relative to said second carriage and for energizing said drum driving stepping motor to take up said X string when said roller is located on the other side of said neutral position relative to said second carriage.

10. The combination defined in calim 5 furher characterized by said means for energizing said first motor simultaneously and in synchronism with the energization of said drum comprising a single driver for producing a motor energizing output signal in response to the tension force exerted on said X string, and means for simultaneously transmitting said second output signal to said latter two motors.

References Cited

UNITED STATES PATENTS

| | | | |
|---|---|---|---|
| 2,847,859 | 10/1958 | Lynott | 33—1(M) |
| 3,379,834 | 4/1968 | Conners | 346—139(B) |
| 3,449,833 | 6/1969 | Dzula | 33—1(M) |
| 3,491,716 | 1/1970 | Ranford | 33—1(M) |
| 3,492,421 | 1/1970 | Cameron | 33—1(M) |

WILLIAM D. MARTIN, Jr., Primary Examiner

U.S. Cl. X.R.

33—137; 116—129; 346—139